United States Patent
Cotugno et al.

(10) Patent No.: US 9,044,911 B2
(45) Date of Patent: Jun. 2, 2015

(54) METHOD OF PRODUCING COLOURED TYRE PORTIONS

(75) Inventors: Salvatore Cotugno, Rome (IT); Paolo Fiorenza, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/124,563

(22) PCT Filed: Jun. 8, 2012

(86) PCT No.: PCT/IB2012/052916
§ 371 (c)(1),
(2), (4) Date: Dec. 6, 2013

(87) PCT Pub. No.: WO2012/168920
PCT Pub. Date: Dec. 13, 2012

(65) Prior Publication Data
US 2014/0102620 A1    Apr. 17, 2014

(30) Foreign Application Priority Data
Jun. 8, 2011  (IT) .............................. TO2011A0504

(51) Int. Cl.
| | | |
|---|---|---|
| B05D 3/10 | (2006.01) | |
| B29D 30/72 | (2006.01) | |
| B60C 13/00 | (2006.01) | |
| B60C 13/04 | (2006.01) | |
| C08J 7/06 | (2006.01) | |
| C08L 23/28 | (2006.01) | |
| B60C 1/00 | (2006.01) | |

(52) U.S. Cl.
CPC .......... *B29D 30/72* (2013.01); *B29D 2030/728* (2013.01); *B60C 13/001* (2013.04); *B60C 13/04* (2013.01); *C08J 7/06* (2013.01); *C08J 7/065* (2013.01); *C08L 23/283* (2013.01); *B60C 1/0025* (2013.04); *C08J 2321/00* (2013.01)

(58) Field of Classification Search
None
See application file for complete search history.

(56) References Cited

U.S. PATENT DOCUMENTS

| | | | |
|---|---|---|---|
| 6,093,271 A | 7/2000 | Majumdar | |
| 2002/0144761 A1 | 10/2002 | Zanzig et al. | |
| 2002/0147257 A1 | 10/2002 | Zanzig et al. | |
| 2008/0251180 A1* | 10/2008 | Cantonetti et al. | 152/565 |
| 2008/0257471 A1 | 10/2008 | Cottin et al. | |
| 2009/0084483 A1 | 4/2009 | Majumdar et al. | |
| 2011/0028597 A1* | 2/2011 | Cantonetti et al. | 523/157 |
| 2011/0275741 A1* | 11/2011 | Cantonetti et al. | 524/8 |
| 2012/0220732 A1* | 8/2012 | Cotugno et al. | 525/366 |
| 2012/0232201 A1* | 9/2012 | Cotugno et al. | 524/219 |
| 2012/0259140 A1* | 10/2012 | Cotugno et al. | 564/511 |
| 2012/0298273 A1* | 11/2012 | Cotugno et al. | 152/510 |
| 2012/0301687 A1 | 11/2012 | Cotugno et al. | |
| 2013/0012649 A1* | 1/2013 | Cotugno et al. | 524/560 |
| 2013/0273282 A1 | 10/2013 | Cotugno et al. | |
| 2014/0206824 A1* | 7/2014 | Grenci et al. | 525/332.5 |

FOREIGN PATENT DOCUMENTS

| | | |
|---|---|---|
| EP | 1 228 901 A2 | 8/2002 |
| EP | 1 228 902 A2 | 8/2002 |
| EP | 2 045 103 A1 | 4/2009 |
| IT | 2009A000964 A | 6/2011 |
| IT | 2010A000850 A | 4/2012 |
| WO | 2006/012942 A1 | 2/2006 |

OTHER PUBLICATIONS

International Search Report of PCT/IB2012/052916, dated Sep. 17, 2012.

* cited by examiner

*Primary Examiner* — Erma Cameron
(74) *Attorney, Agent, or Firm* — Sughrue Mion, PLLC

(57) ABSTRACT

A method of producing colored tire portions, the method including: a step of forming a highly impermeable barrier layer; and a step of depositing a dye or colored layer on the barrier layer. The step of forming the barrier layer includes, in sequence, the operations of (a) depositing an aqueous dispersion on the part of the tire for coloring; (b) separating said aqueous dispersion into an aqueous phase and a solid phase; and (c) removing the aqueous phase.

14 Claims, No Drawings

METHOD OF PRODUCING COLOURED TYRE PORTIONS

CROSS REFERENCE TO RELATED APPLICATIONS

This application is a National Stage of International Application No. PCT/IB2012/052916 filed Jun. 8, 2012, claiming priority based on Italian Patent Application No. TO2011A000504, filed Jun. 8, 2011, the contents of all of which are incorporated herein by reference in their entirety.

TECHNICAL FIELD

The present invention relates to a method of producing coloured tyre portions.

BACKGROUND ART

For some years, the tyre industry has been producing tyres with coloured portions for various, not least of all aesthetic, reasons.

The methods used to date are based on using a rubber compound coloured with appropriate pigments.

More specifically, the most commonly used methods substantially comprise using three layers a first cushion layer contacting the inner layers of the tyre; a coloured second layer made from the coloured compound; and a third outer cover layer, which is removed prior to sale.

This method is not always successful in preventing deterioration of the coloured portion, particularly by chemical agents migrating from the inner layers of the tyre to the coloured outer compound. A common practice to slow down deterioration is to increase the thickness of the coloured layer, though this has inevitable drawbacks in terms of heat generation and, therefore, rolling resistance.

The Applicant has devised a method of producing coloured tyre portions, whereby a polymer barrier layer obtained from an aqueous dispersion is deposited on the part of the tyre for colouring, as described in Patent Applications TO2009A000964 and TO2010A000850, which are included herein by way of reference.

The above method has the major advantage of producing coloured tyre portions of durable colour, and with no impairment in rolling resistance.

On the other hand, it has the drawback of the dispersion taking a long time to dry to form the barrier layer.

DISCLOSURE OF INVENTION

It is an object of the present invention to provide a method of producing coloured tyre portions, designed to eliminate the drawbacks of the known art.

According to the present invention, there is provided a method of producing coloured tyre portions, said method comprising:
a step of forming a highly impermeable barrier layer; and
a step of depositing a dye or coloured layer on said barrier layer;
said method being characterized in that the step of forming the barrier layer comprises successively (a) depositing an aqueous dispersion on the part of the tyre for colouring; (b) separating said aqueous dispersion into an aqueous phase and a solid phase; and (c) removing said aqueous phase.

BEST MODE FOR CARRYING OUT THE INVENTION

The operation (b) of separating the aqueous dispersion into an aqueous phase and a solid phase preferably comprises bringing into contact with said dispersion a coagulant solution selected from an acid solution, a basic solution, and a saline solution.

Preferably, the acid solution is selected from solutions of hydrochloric acid, sulphuric acid, phosphoric acid, boric acid, or aliphatic or aromatic, mono- or di- or trifunctional, saturated or unsaturated carboxylic acids; the basic solution is selected from solutions of alkaline metal, alkaline earth metal or ammonium hydroxides; and the saline solution is selected from solutions of saturated or unsaturated, mono- or di- or trifunctional aliphatic carboxylates, salts of mono- or di- or trifunctional aromatic acids, or chlorides, sulphates, formates, acetates, phosphates, carbonates, aluminates of alkaline metal, alkaline earth metal or ammonium.

Preferably, the acid solution comprises hydrochloric acid, the basic solution comprises sodium hydroxide, and the saline solution comprises calcium chloride.

The aqueous phase is preferably removed by evaporation and/or dehydration.

Said coloured layer is preferably made of rubber, and even more preferably comprises, in sequence, a first adhesive sub-layer designed to contact the barrier layer; a second barrier sub-layer; and a third sub-layer of coloured rubber.

Said dye is preferably a water-based dye, a polyurethane dye, or a photo-cross-linkable dye if subjected to UV radiation.

The aqueous dispersion preferably comprises at least one cross-linkable polymer base and a surfactant of molecular formula (I)

$$(R_1CONR_2CHR_3COO^-)n\ X^{n+} \qquad (I)$$

where:
$R_1$ is an aliphatic group $C_6$-$C_{23}$
$R_2$ is H or an aliphatic group $C_1$-$C_8$
$R_3$ is H or an aliphatic or aromatic group $C_1$-$C_8$
X is a metallic, preferably alkaline, cation, and
n is an integer of 1 to 3.

The aliphatic group $R_1$ preferably comprises a double bond.

The aqueous dispersion of the barrier layer preferably comprises at least one cross-linkable polymer base and a surfactant of molecular formula (II)

$$([R_4R_5R_6NR_8(NR_7R_9R_{10})n]^{(n+1)+})y\ (n+1)X^{Y-} \qquad (II)$$

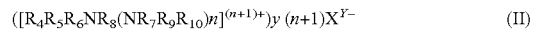

where:
X is an atom or anionic group
$R_4$, $R_5$ and $R_6$, which are the same or different, are each $C_mH_{2m+1}$, where m is 1 to 3, or, or $CH_2CHCH_2$ or $CHCHCH_3$
$R_7$, $R_9$ and $R_{10}$, which are the same or different, are each $CH_2CHCH_2$ or $CHCHCH_3$
n is 0 or 1
y is 1, if n is 1; y is 1 or 2, if n is 0
$R_8$ is an aliphatic group $C_{15}$-$C_{22}$, when n is 0; and is an aliphatic group $C_8$-$C_{16}$, when n is 1
at least one of $R_4$, $R_5$, $R_6$ and $R_8$ comprises a double bond, when n is 0.

Preferably, $R_7$, $R_8$ and $R_9$ are $CH_2CHCH_2$ and, more preferably, n is 1 and $R_8$ is a saturated aliphatic group.

Preferably, $R_8$ comprises a double bond and n is 0.

The surfactant preferably has a molecular formula in the group comprising:

$$[(CH_3)_3N(CH_2)_8CHCH(CH_2)_7CH_3]^+X^-;$$

$$[(CH_2CHCH_2)_3N(CH_2)_{15}CH_3]^+X^-;$$

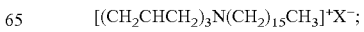

$$[(CH_3)(CH_2CHCH_2)_2N(CH_2)_{15}CH_3]^+X^-;$$

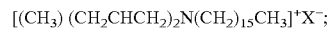

$[(CH_2CHCH_2)(CH_3)_2N(CH_2)_{15}CH_3]^+X^-;$ $[(CH_2CHCH_2)_3N(CH_2)_{12}N(CH_2CHCH_2)_3]^{2+}2X^-$

Preferably, $X^-$ is $I^-$ or $Br^-$.

The aqueous dispersion preferably comprises at least one filler in the group comprising kaolin, clay, mica, feldspar, silica, graphite, bentonite, carbon black, and alumina.

The cross-linkable polymer base preferably comprises polymers with a Tg of over 0° C.

The following are purely non-limiting examples for a clearer understanding of the invention.

EXAMPLES

The following is a description of the compounds forming the protective layers of the present invention.

The compounds described are all characterized by being highly impermeable, through using high Tg polymers or appropriate amounts of clay.

Use of high Tg polymers and mineral fillers is made possible by the compounds being formed from aqueous dispersions comprising at least one surfactant of molecular formula (I) or (II). Using the conventional Banbury compound-making technique, components such as high Tg polymers or mineral fillers are not dispersed thoroughly or at any rate effectively enough to function as a barrier layer, whereas, being mixed in dispersion, the ingredients of the compounds in the present invention are dispersed thoroughly, whatever the type.

The protective layers are then formed from the resulting compounds by depositing an aqueous dispersion on the part of the tyre for colouring, e.g. the sidewall, and then removing the water.

Each aqueous dispersion is prepared by dispersing and mixing the compound components in water. More specifically, the dispersions are prepared by dispersing all the ingredients in Table I simultaneously in 1 litre of water. The resulting aqueous dispersion is then stirred mechanically for 30 minutes and subsequently sonicated for 15 minutes.

The above aqueous dispersion-making process in no way constitutes a limitation of the present invention.

The dispersion is sprayed or brushed onto the sidewall of a tyre.

Once deposited, the dispersion is applied with a coagulant selected from a 4 pH hydrochloric acid solution, a 10 pH sodium hydroxide basic solution, or a 0.2 M calcium chloride saline solution.

Application of the coagulant immediately separates the dispersion into a surface aqueous phase and an underlying polymer phase.

The aqueous phase is removed by evaporation in less than 1 minute, but may be removed using any other method capable of forming the impermeable polymer layer from the aqueous dispersion.

Separating the dispersion deposited on the tyre part for colouring into an aqueous phase and a solid phase permits rapid removal of the aqueous phase. Without this separation, a highly impermeable surface polymer layer may form, preventing the residual water from evaporating. In other words, without the coagulant solution, removing the water from the dispersion would take a long time, with obvious drawbacks in terms of output.

Any other means of separating the dispersion into an aqueous phase and solid phase may be substituted for the coagulant solution; and other acid, basic or saline solutions may be substituted for those referred to above, provided they are capable of separating the aqueous dispersion into a solid phase and aqueous phase.

Removing the water as described above forms a roughly 0.3 mm thick barrier layer.

Two surfactants (a, b) in the molecular formula (1) class, and five surfactants (c, d, e, f, g) in the molecular formula (II) class were used in the following examples:

surfactant (a) of molecular formula $CH_3(CH_2)_7CHCH(CH_2)_7CONHCH_2COO^-Na^+;$ surfactant (b) of molecular formula $CH_2CH(CH_2)_8CONHCH_2COO^-Na^+;$ surfactant (c) of molecular formula $[(CH_3)_3N(CH_2)_8CHCH(CH_2)_7CH_3]^+I^-;$ surfactant (d) of molecular formula $[(CH_2CHCH_2)_3N(CH_2)_{15}CH_3]^+Br^-;$ surfactant (e) of molecular formula $[(CH_3)(CH_2CHCH_2)_2N(CH_2)_{15}CH_3]^+I^-;$ surfactant (f) of molecular formula $[(CH_2CHCH_2)(CH_3)_2N(CH_2)_{15}CH_3]^+I^-;$ surfactant (g) of molecular formula $[(CH_2CHCH_2)_3N(CH_2)_{12}N(CH_2CHCH_2)_3]^{2+}2Br^-.$ Table I shows the compositions in phr of five compounds A-E obtained from respective dispersions in accordance with the present invention. More specifically, the polymer base composition in compounds A-E was altered by inserting increasingly high Tg polymers.

TABLE I

| | A | B | C | D | E |
|---|---|---|---|---|---|
| Cl-IIR | 70 | 70 | 70 | 70 | 70 |
| CR | 30 | — | — | — | — |
| SBR | — | 30 | — | — | — |
| PMA | — | — | 30 | — | — |
| PEMA | — | — | — | 30 | — |
| ABS | — | — | — | — | 30 |
| CARBON BLACK | 50 | 50 | 50 | 50 | 50 |
| RESIN | 10 | 10 | 10 | 10 | 10 |
| ZnO | 1.5 | 1.5 | 1.5 | 1.5 | 1.5 |
| SULPHUR | 2.8 | 2.8 | 2.8 | 2.8 | 2.8 |
| ACCELERANTS | 1.5 | 1.5 | 1.5 | 1.5 | 1.5 |
| SURFACTANT (a) | 2.0 | 2.0 | 2.0 | 2.0 | 2.0 |

Cl-IIR = chlorobutyl rubber; CR = chloroprene; SBR = styrene butadiene rubber; PMA = polymethacrylate; PEMA = polyethyl methyl acrylate; ABS = acrylonitrile butadiene styrene terpolymer.

Table II shows the compositions in phr of three compounds F-H obtained from respective dispersions in accordance with the present invention, and to which increasing amounts of clay were added.

TABLE II

| | F | G | H |
|---|---|---|---|
| Cl-IIR | 100 | 100 | 100 |
| CARBON BLACK | 50 | 50 | 50 |
| CLAY | 30 | 70 | 110 |
| RESIN | 10 | 10 | 10 |
| ZnO | 1.5 | 1.5 | 1.5 |
| SULPHUR | 2.8 | 2.8 | 2.8 |
| ACCELERANTS | 1.5 | 1.5 | 1.5 |
| SURFACTANT (b) | 2.0 | 2.0 | 2.0 |

Table III shows the compositions in phr of three compounds I-O obtained from respective dispersions in accordance with the present invention.

TABLE III

|  | I | L | M | N | O |
|---|---|---|---|---|---|
| Cl-IIR | 100 | 100 | 100 | 100 | 100 |
| CARBON BLACK | 50 | 50 | 50 | 50 | 50 |
| CLAY | 110 | 110 | 110 | 110 | 110 |
| RESIN | 10 | 10 | 10 | 10 | 10 |
| ZnO | 1.5 | 1.5 | 1.5 | 1.5 | 1.5 |
| SULPHUR | 2.8 | 2.8 | 2.8 | 2.8 | 2.8 |
| ACCELERANTS | 1.5 | 1.5 | 1.5 | 1.5 | 1.5 |
| SURFACTANT (c) | 2.0 | — | — | — | — |
| SURFACTANT (d) | — | 2.0 | — | — | — |
| SURFACTANT (e) | — | — | 2.0 | — | — |
| SURFACTANT (f) | — | — | — | 2.0 | — |
| SURFACTANT (g) | — | — | — | — | 2.0 |

The fillers considered in the barrier layer according to the invention preferably comprise mineral particles of 0.2 to 2 μm in diameter and a 5 to 30, preferably 8 to 20, aspect ratio, and are preferably in the group comprising kaolin, clay, mica, feldspar, silica, graphite, bentonite, carbon black and alumina.

The protective layer formed was applied with a water-based dye, in particular one in the group known as 'VERNICI IMC IDRO' or 'IMC IDROFLEX' produced and marketed by SIVAM VERNICI SPA.

The barrier layer and water-based dye layer may be cross-linked when or after curing the tyre, i.e. the colouring may be applied to a cured or green tyre.

As an alternative to water-based dye, the protective layer formed may be applied with a commercial coloured rubber layer of less than 1 mm thick. The one used is known by the trade name 'Rubber Label Reel Palomino', and is produced and marketed by VENETADECALCOGOMME s.r.l.

The coloured rubber layer normally comprises sub-layers: a first adhesive sub-layer (contacting the barrier layer, in use); a second barrier sub-layer; and a third coloured rubber sub-layer. Though this coloured rubber layer structure may safely be used in the present invention, the adhesive sub-layer and barrier sub-layer are not strictly necessary, i.e. the coloured rubber layer may simply comprise the coloured rubber sub-layer.

The barrier layer and coloured rubber layer may be cross-linked when or after curing the tyre, i.e. in this case, too, the colouring may be applied to a cured or green tyre.

The method according to the present invention provides for producing coloured tyre portions of long-lasting colour, with no increase in rolling resistance and, at the same time, at a high output rate.

It also has the advantage of being easy to implement, by simply, for example, applying an acid, basic or saline solution to the aqueous dispersion, and evaporating the aqueous phase using, for example, a convective air current, heat, or microwave radiation.

The invention claimed is:

1. A method of producing coloured tyre portions, said method comprising:
    a step of forming an impermeable barrier layer; and
    a step of depositing a dye or coloured layer on said barrier layer;
    said method being characterized in that the step of forming the barrier layer comprises, in sequence, the operations of (a) depositing an aqueous dispersion on the part of the tyre for colouring; (b) separating said aqueous dispersion into an aqueous phase and a solid phase; and (c) removing said aqueous phase;
    said aqueous dispersion comprising at least one cross-linkable polymer base and a surfactant according to the following molecular formula (I) or molecular formula (II):

$$(R_1 CONR_2 CHR_3 COO^-)n\ X^{n+} \quad (I)$$

wherein in molecular formula (I):
$R_1$ is an aliphatic group $C_6$-$C_{23}$,
$R_2$ is H or an aliphatic group $C_1$-$C_8$,
$R_3$ is H or an aliphatic or aromatic group $C_1$-$C_8$,
X is a metallic cation, and
n is an integer of 1 to 3;

$$([R_4 R_5 R_6 NR_8 (NR_7 R_9 R_{10})n]^{(n+1)+})y\ (n+1)X^{y-} \quad (II)$$

wherein in molecular formula (II):
X is an atom or anionic group,
$R_4$, $R_5$ and $R_6$, which are the same or different, are each $C_m H_{2m+1}$, where m is 1 to 3, or $CH_2 CHCH_2$ or $CHCHCH_3$,
$R_7$, $R_9$ and $R_{10}$, which are the same or different, are each $CH_2 CHCH_2$ or $CHCHCH_3$,
n is 0 or 1,
y is 1, if n is 1; y is 1 or 2, if n is 0,
$R_8$ is an aliphatic group $C_{15}$-$C_{22}$, when n is 0; and is an aliphatic group $C_8$-$C_{16}$, when n is 1, and
at least one of $R_4$, $R_5$, $R_6$ and $R_8$ comprises a double bond, when n is 0.

2. A method of producing coloured tyre portions, as claimed in claim 1, characterized in that said operation (b) of separating the aqueous dispersion into an aqueous phase and a solid phase comprises bringing into contact with said dispersion a coagulant solution selected from an acid solution, a basic solution, and a saline solution.

3. A method of producing coloured tyre portions, as claimed in claim 1, characterized in that the aqueous phase is removed by evaporation and/or dehydration.

4. A method of producing coloured tyre portions, as claimed in claim 1, characterized in that said coloured layer is made of rubber.

5. A method of producing coloured tyre portions, as claimed in claim 4, characterized in that said coloured layer comprises, in sequence, a first adhesive sub-layer designed to contact the barrier layer; a second barrier sub-layer; and a third sub-layer of coloured rubber.

6. A method of producing coloured tyre portions, as claimed in claim 1, characterized in that said dye is a water-based dye, a polyurethane dye, or a photo-cross-linkable dye if subjected to UV radiation.

7. A method of producing coloured tyre portions, as claimed in claim 1, characterized in that the aqueous dispersion comprises at least one filler in the group selected from the group consisting of kaolin, clay, mica, feldspar, silica, graphite, bentonite, carbon black, and alumina.

8. A method of producing coloured tyre portions, as claimed in claim 1, characterized in that the cross-linkable polymer base comprises polymers with a Tg of over 0° C.

9. The method of producing coloured tyre portions, as claimed in claim 1, characterized in that said aqueous dispersion comprises the surfactant according to molecular formula (I).

10. A method of producing coloured tyre portions, as claimed in claim 9, characterized in that the aliphatic group $R_1$ of molecular formula (I) comprises a double bond.

11. The method of producing coloured tyre portions, as claimed in claim 1, characterized in that said aqueous dispersion comprises the surfactant according to molecular formula (II).

12. A method of producing coloured tyre portions, as claimed in claim 11, characterized in that, in molecular formula (II), n is 1 and $R_8$ is a saturated aliphatic group.

13. A method of producing coloured tyre portions, as claimed in claim 11, characterized in that, in molecular formula (II), $R_4$, $R_5$ and $R_6$ are $CH_2CHCH_2$.

14. A method of producing coloured tyre portions, as claimed in claim 13, characterized in that $R_8$ comprises a double bond and n is 0.

* * * * *